Figure 12:
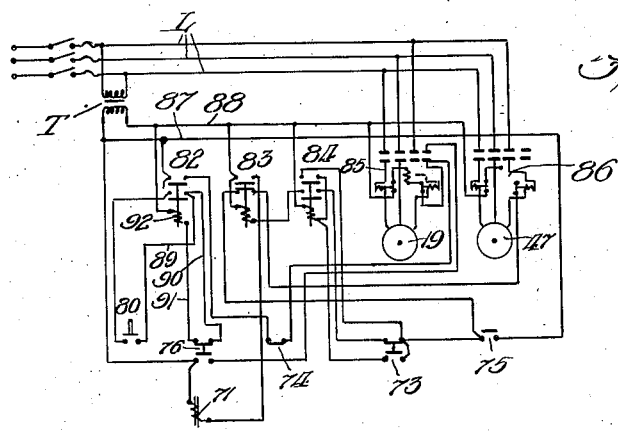
Figure 13:
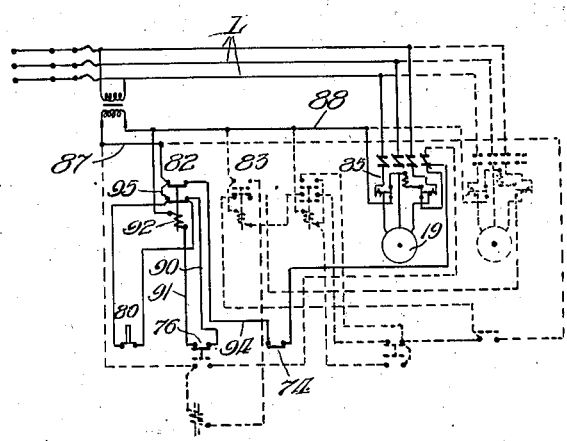

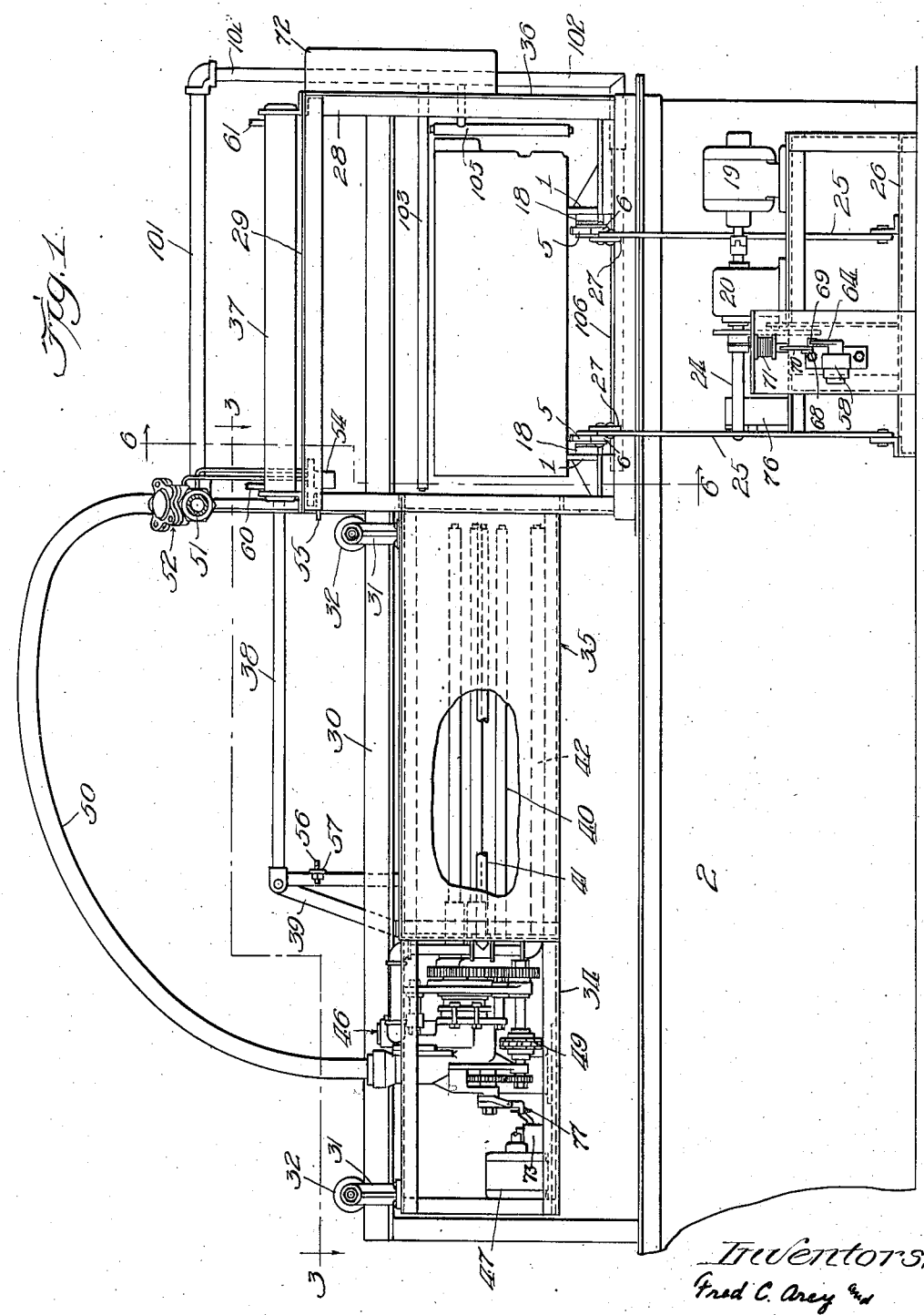

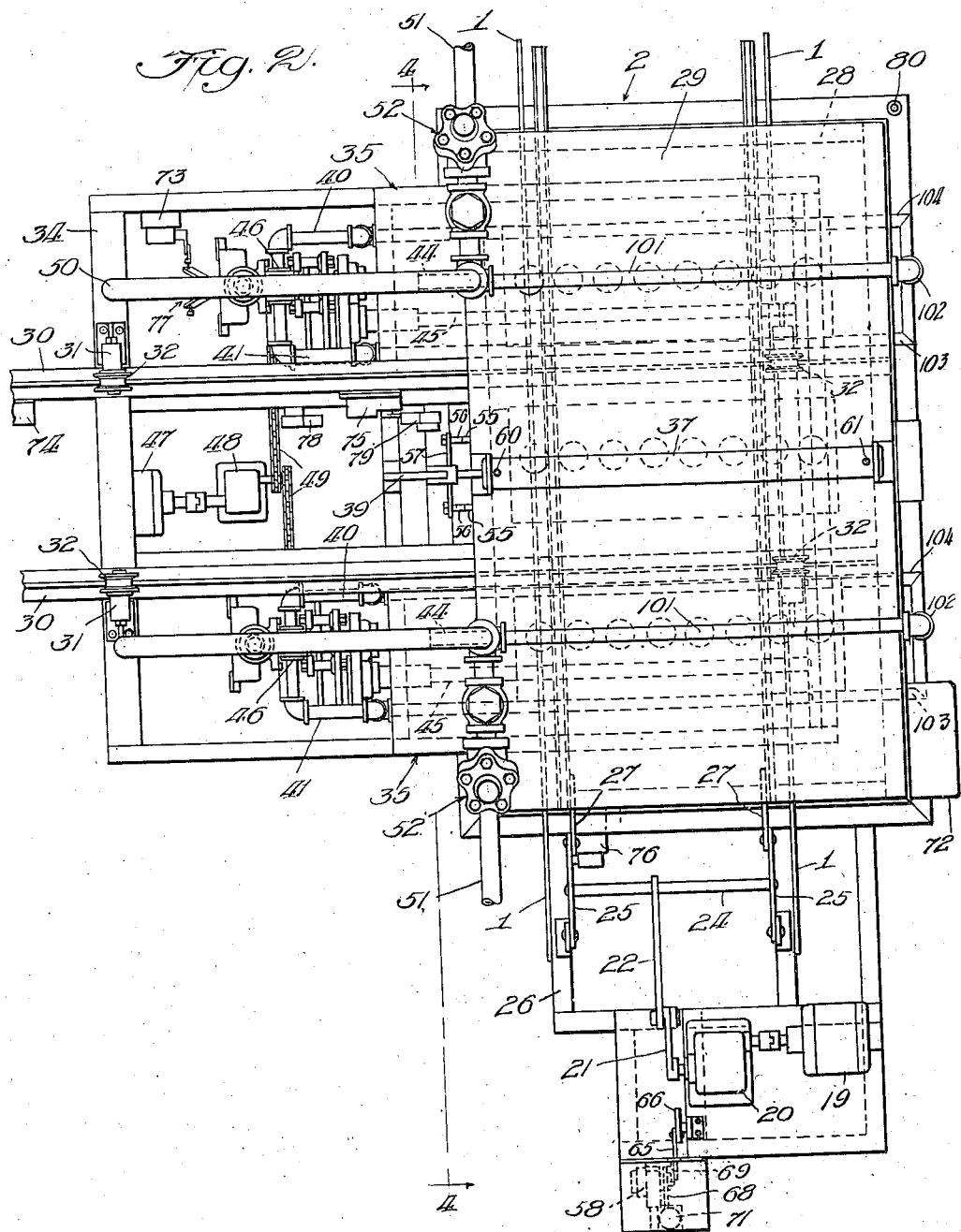

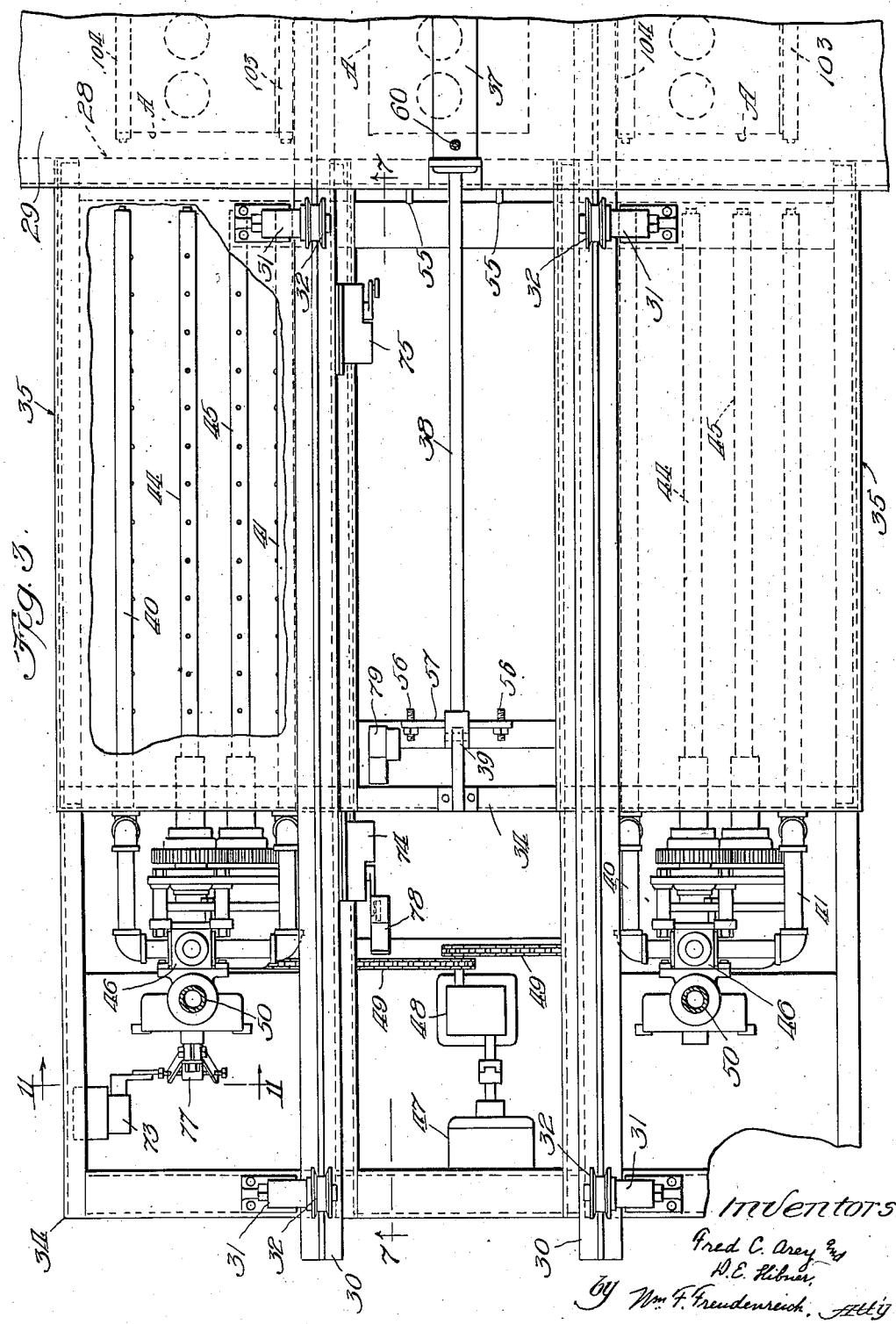

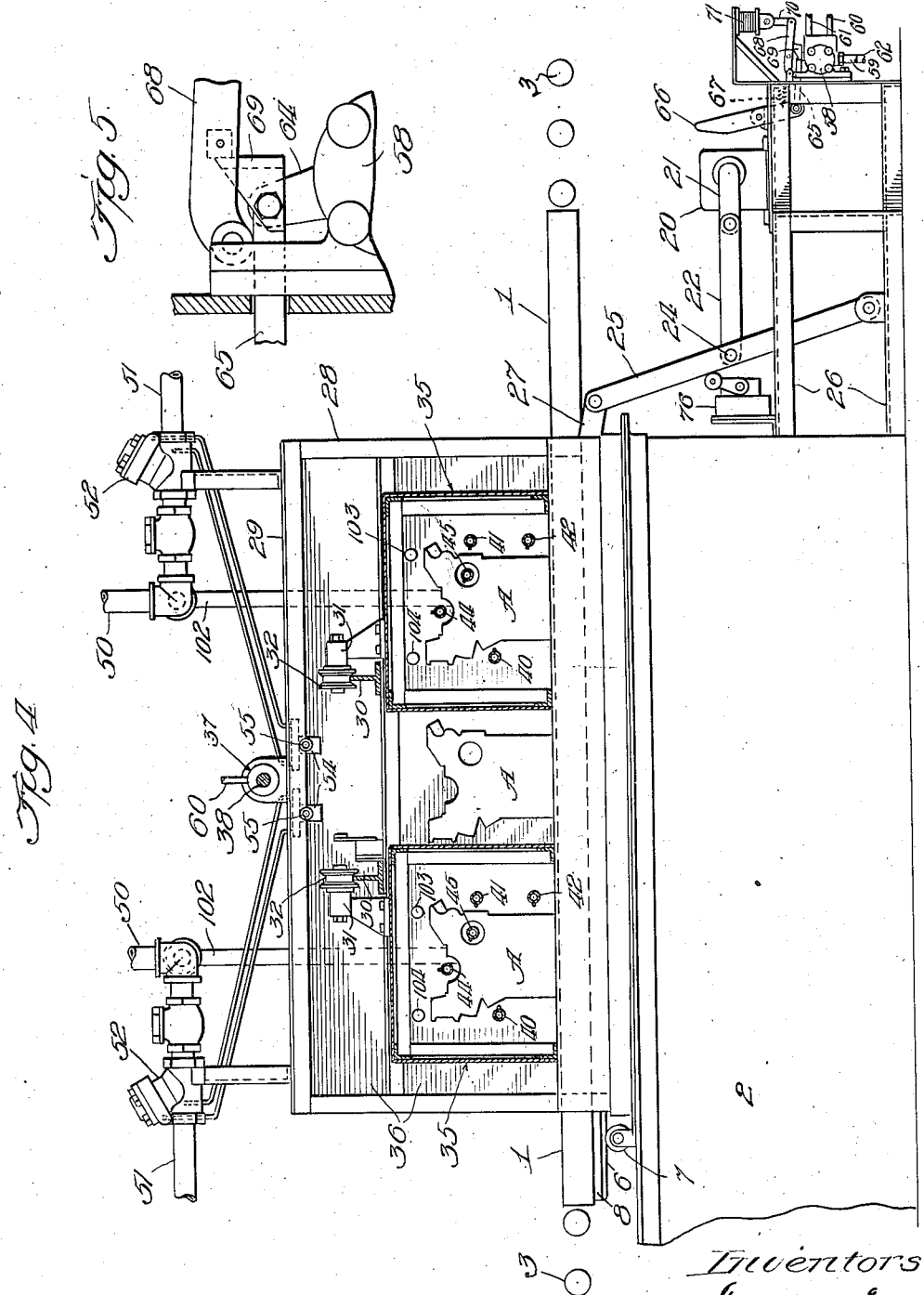

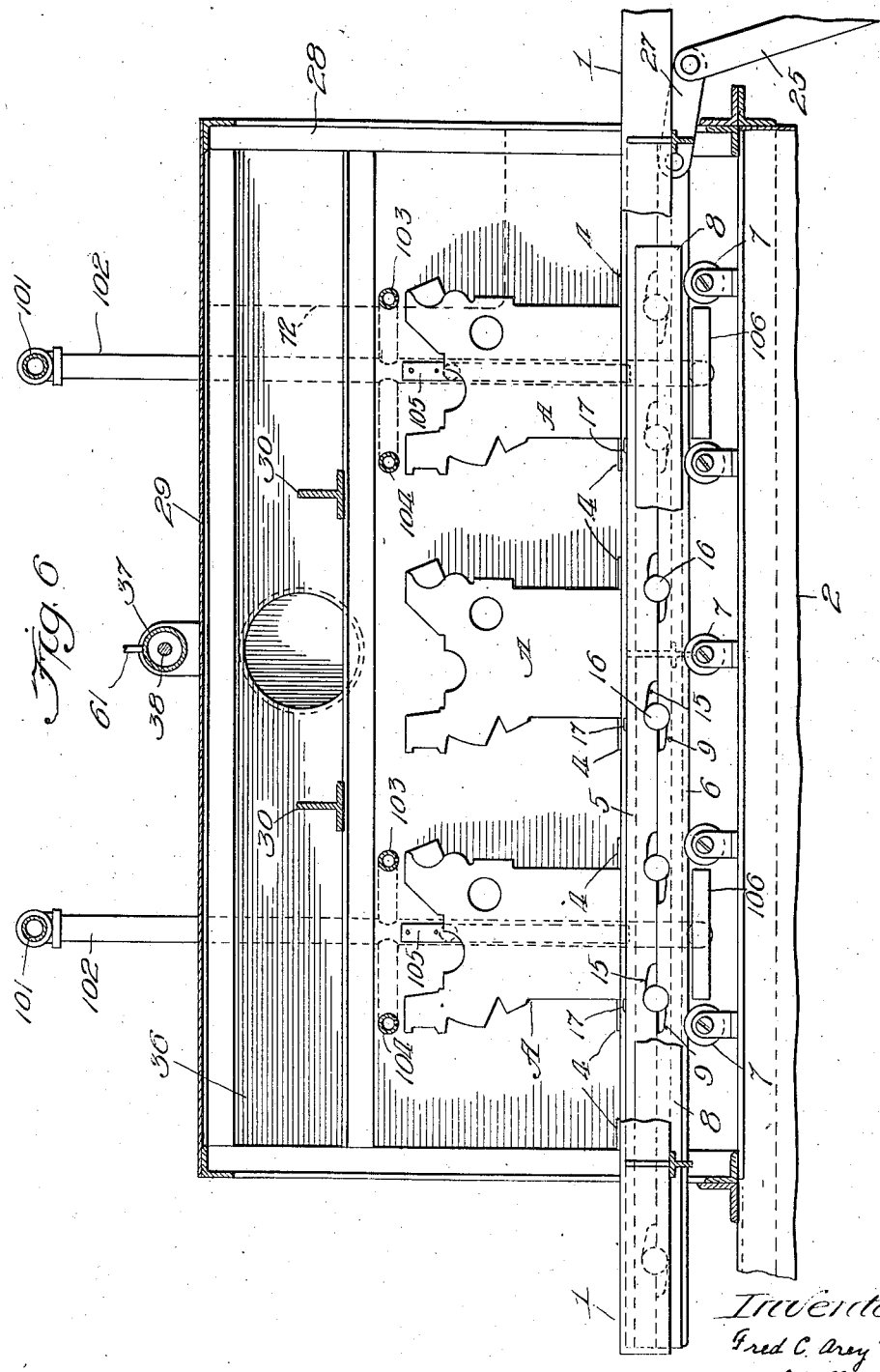

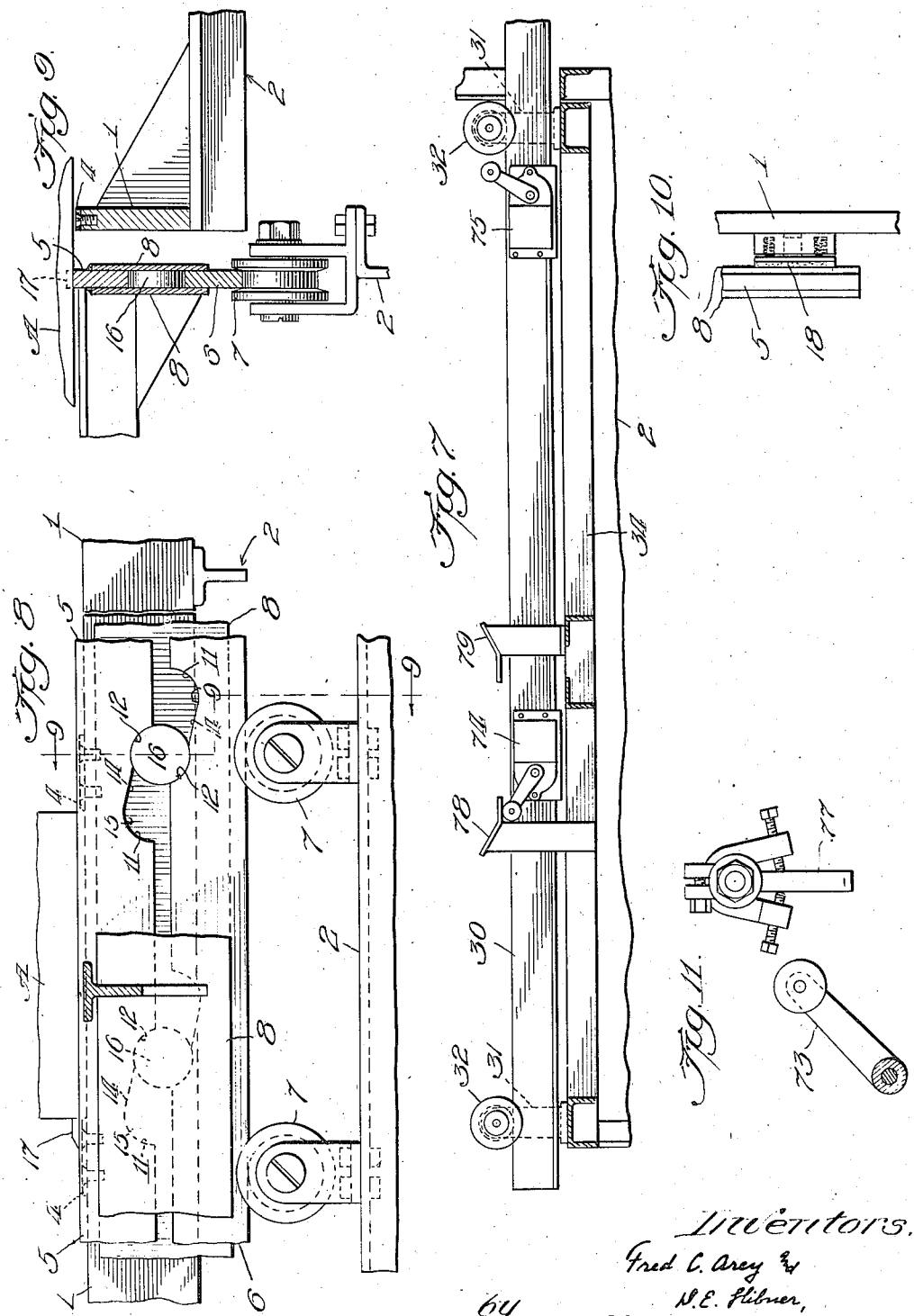

Jan. 15, 1946.  F. C. AREY ET AL  2,393,215
MOTOR BLOCK CLEANER
Filed Dec. 19, 1941  8 Sheets-Sheet 8

Inventors:
Fred C. Arey &
D. C. Hebner,
By Wm. G. Freudenreich, Atty.

Patented Jan. 15, 1946

2,393,215

UNITED STATES PATENT OFFICE 2,393,215

MOTOR BLOCK CLEANER

Fred C. Arey and De Los E. Hibner, Du Bois, Pa., assignors to Vulcan Soot Blower Corporation, a corporation of Pennsylvania Application December 19, 1941, Serial No. 423,596

7 Claims. (Cl. 134—82)

The present invention relates to machines or apparatuses for cleaning the oil, metal chips, and other loose foreign particles from the motor blocks of internal combustion engines prior to the assembling of other engine parts thereon. In our prior Patents No. 2,216,698 and No. 2,258,562 the motor blocks are received upon a table from which they are pushed into the chamber in which the cleaning is done, and from which they must again be returned to the table before they can be carried away. If the motor blocks are brought to the table by a conveyer and are then carried away by another conveyer, it means that the workman must handle each block several times to get it into the cleaning apparatus and again start it on its way from the place of cleaning, even though power means be provided to move the block into and out of the cleaning chamber.

The object of the present invention is to produce a simple and novel apparatus through which engine blocks may travel in the same direction as that in which they reached the place of cleaning and may then, while still travelling in the same direction, move out of the cleaning chamber and away from the place of cleaning.

The cleaning in this general type of apparatus is accomplished by means of jetting pipes or tubes which are supplied with one or more fluids to be discharged into the passages and over the surfaces to be cleaned. Some, at least, of these jetting devices must be positioned in the crank chamber and at the sides of the block. Heretofore these jetting devices have been so arranged in fixed positions so as to permit a block to be moved into cleaning position with respect thereto, by travelling in the direction of the longitudinal axis of the block. It is for this reason that it has been necessary to move each block laterally out of the main line of travel to and from the place of cleaning, in order to enter it in and again remove it from the cleaning chamber. In accordance with the present invention, the jetting devices are so mounted and so manipulated that those which did interfere with a straight forward movement of a motor block from the time it approaches the cleaning chamber to the time it passes from the latter, are retracted during periods of travel of the motor blocks and are brought into cleaning positions at times when the motor blocks are stationary within the cleaning chambers.

The various features of novelty whereby our invention is characterized will hereinafter be pointed out with particularity in the claims; but, for a full understanding of our invention and of its objects and advantages, reference may be had to the following detailed description taken in connection with the accompanying drawings, wherein:

Figure 1 is an end elevation of an apparatus embodying the present invention, showing the end at which the motor blocks are discharged; Fig. 2 is a top plan view of the apparatus, showing the movable tubular cleaning elements and housings in their working positions as distinguished from the retracted or idle positions of Fig. 1; Fig. 3 is a section on line 3—3 of Fig. 1, showing a fragment of the apparatus on a larger scale, but with the parts in the same positions as in Fig. 1; Fig. 4 is a section on line 4—4 of Fig. 2, with the base portion of the apparatus shown in end elevation; Fig. 5 is an enlarged detail of a fragment of the air valve mechanism shown at the extreme right-hand end of Fig. 4; Fig. 6 is a section on line 6—6 of Fig. 1, but on a larger scale; Fig. 7 is a section on line 7—7 of Fig. 3, showing only a fragment of the apparatus; Fig. 8 is a sectional view showing a fragment of the mechanism for moving motor blocks, step by step, through the apparatus, the relatively movable rails being shown in different relative positions than they are in Fig. 6; Fig. 9 is a section on line 9—9 of Fig. 8; Fig. 10 is a top plan view of fragments of the stationary rail and the upper movable rail in each of Figs. 8 and 9, in the region containing an interposed brake shoe; Fig. 11 is a section on line 11—11 of Fig. 3, but on a larger scale, illustrating only a fragment of the timing switch and the actuator therefor; and Figs. 12 to 16, inclusive, are diagrams of the electrical connections, illustrating a sequence of operations constituting a complete cycle.

Referring to the drawings; 1, 1 represent a pair of horizontal, stationary, parallel rails spaced apart from each other a distance somewhat less than the length of a motor block to be cleaned. These rails are suitably supported at some distance from the floor upon any suitable base 2. These rails lie between conveyer sections which are indicated only in Fig. 4, as rollers 3, since the details of these elements constitute no part of the present invention; the only thing that should be considered being that motor blocks may be moved straight ahead from the rollers at the left-hand end of Fig. 4, along the rails and then be delivered to the rollers 3 at the righthand end. In this way the only movements of the blocks are straight ahead from the time that they approach the cleaning apparatus. The particular apparatus illustrated is one in which each block is first washed, in which the washing liquid is then permitted to drain off, and which is then dried, so as to leave the apparatus in a dry condition; and, for the sake of brevity, only this particular embodiment of the invention will be described in detail. Accordingly, in the apparatus illustrated, each motor block is placed successively in three different positions or stations along the rails. In the first position, the block is washed in the same way as our aforesaid patents, by means of properly directed jets of washing liquid. After a predetermined interval of time, the block is moved ahead to the draining station where it is simply permitted to stand until the following block has been washed, whereupon both blocks are moved ahead so as to bring the first block to the drying station and the second block to the draining station. At the drying station air or gas, warm or at room temperature, is discharged in the form of jets against and into the block, conveniently through the same type of jetting apparatus as that employed at the washing station.

As best shown in Fig. 6, each of the three stations is defined by a pair of low projections 4, 4 on top and spaced apart from each other lengthwise of each of the stationary rails; the distance between the projections of each pair being equal to the width of the bottom end of the motor block A which is to be cleaned. In other words, when a motor block is set upon the stationary rails, with its long axis extending crosswise of the rails, between a pair of the projections on each rail, it is held accurately in position, and prevented from accidental displacement forwardly or rearwardly, by these projections. In order to move a motor block ahead, it must first be lifted high enough to clear the projections or, stating it differently, the block must be lifted from its seat on the rails. After this has been done, the block may be carried forward to the next seat and then be lowered into the latter.

The means for raising and lowering the motor blocks and for carrying them from one seat to another and finally discharging them, may conveniently comprise pairs of cooperating movable rails which will now be described. These rails are arranged in pairs, one rail above the other, and each pair being placed near the inner side of and near one of the stationary rails. As best shown in Figs. 6, 8 and 9, each pair of conveyer rails comprises an upper rail 5 and a lower rail 6. Each of the rails 6 rests in the peripheral grooves of and is supported by a group of flanged rollers 7 distributed lengthwise of the rails and supported in any suitable way by the base 2. Each of the upper movable rails rests on top of the corresponding rail 6 and is preferably provided with depending flanges that overlap the upper marginal portions of the lower rail so as to prevent relative, transverse movements. These flanges are conveniently produced by welding plates 8 to opposite sides of the rails 5; the plates projecting far enough below the bottom edge of that rail to provide the desired overlap with respect to the lower rail. Each of the rails 6 has in the upper edge a series of recesses 9 distributed along the rail. Each of these recesses is deeper at one end than the other, so that the bottom thereof is sloping. Viewed from the side of the rail, the deep end 11 of each of the depressions is in the form of a quarter circle, whereas the shallow end 12 is in the form of a lesser arc of the same circle. The straight bottom portion 14 of each recess is tangent to the curved portion 11, but meets the curved portion 12 somewhat above the lowermost point, so that any object resting in the curved seat 12 must be lifted slightly before it can pass over the hump and reach the incline 14. In the lower edge of each of the upper rails 5 are a similar and similarly-spaced series of notches or depressions 15. However, the notches or depressions in the upper rails are turned end for end with respect to the corresponding notches or depressions in the lower rails.

Within each pair of cooperating notches or recesses, one in the upper and the other in the lower rail, is a roller 16 of the same radius as the radii of the curved ends of the notches or recesses. It will be seen that when a rail 5 is so positioned with respect to the corresponding rail 6 as to bring the centers or axes of the deep ends of its notches or recesses into registration with the axes or centers of the deep ends and the notches or recesses in the other rail, room is provided for the rollers while the rails are resting one upon the other, as shown in Fig. 6. If, as viewed in Fig. 6, the lower rail 6 is moved toward the right while the rail 5 is held stationary, it will be seen that the rollers must all ride up on the inclined bottoms 14 of the notches or recesses in the lower rail. Therefore, since the only vertical support for the upper rail 5 is the rollers, this rail must rise. Then, after the rollers have reached the shallow ends of the notches or recesses in the lower rail, a further movement of that rail toward the right, causes the rollers to travel through the length of the notches or recesses in the upper rail, thus lifting the upper rail still higher. The condition is now as illustrated in Fig. 8. It will be seen that the motor block has now been lifted high enough to clear the lugs 4 on the stationary rail 1, so that during a further movement toward the right of the rail 6 and, therefore, a corresponding movement of the rail 5, the motor block will be carried along with the movable rails which are now its only support. In order to insure that there can be no relative movement between the motor block and the rails 5 lengthwise of the latter, during the lifting of the motor block from the stationary rails, and thereafter, the rails 5 are provided on their upper edges with lugs or bosses 17 which rise up behind the engine block and in engagement therewith before the lifting of the block begins. Then, after the block has been lifted above the projections 4 on the stationary rails, and the rails 5 start to move lengthwise, the lugs 17 remain behind the block to push it ahead.

When the movement of the rail 6 is reversed, it will be seen that the first result is again to lower the motor block upon the stationary rails, the rails then continuing their backward movement in unison.

It will thus be seen that by providing means for reciprocating the lower rails 6, through a proper distance, the movement thereof in one direction will result in picking up such blocks as the apparatus may contain, moving such blocks ahead through the distance of one station to another, and then lowering the blocks to position them again in new locations. The return movement, of course, places the movable rails in position to repeat the performance.

Each of the stationary rails may be provided with an extra stop or projection 4 in advance of the several seats or stations; this being at the left in Fig. 6. All that the workmen need do is to push a motor block against these additional stops or projections, which so locate them that each block will be picked up and carried to the washing station during that part of the cycle which transfers blocks from one station to the next.

It should be noted that the plates 8 welded to the rails 5 have the added function of pocketing the rollers 16 so that they cannot escape in the sidewise directions.

In order to insure that the rails 5 will not move lengthwise during the preliminary lifting movements thereof, it is advisable to provide means frictionally to hold them against lengthwise movements. This means may conveniently consist of spring-pressed brake shoes 18 interposed between the rails 5 and the rails 1, as shown in Figs. 1 and 10.

The rails 6 may conveniently be reciprocated through power supplied by an electric motor 19, best shown in Figs. 1 and 2. This motor, operating through a speed-reducing mechanism 20, drives a crank 21, which is connected by a link 22 to a cross bar 24 extending between a pair of more or less vertical levers 25 hinged at their lower ends to a platform 26 that forms a low extension of the base 2. The upper end of each of these levers is connected to the adjacent end of one of the bars 6 by a link 27.

The rails previously described extend through what may be termed a casing, within which the several stations for a block that is being cleaned lie; although the structure need be nothing more than a framework, such as indicated at 28, which may be provided with a top or roof 29; the framework leaving unobstructed openings at both ends to permit the entrance and exit of the motor blocks. It is desirable, however, to enclose each motor block during the jetting operations thereon; and we therefore provide housings that are slipped into place to cover the blocks while the jetting is being carried out; these housings being retracted to get them out of the way while blocks are being shifted. Since at least some of the tubular jetting elements must extend across the path of the motor blocks, being required to lie in front of and behind, and even to extend through the block during a cleaning operation; these jetting elements are mounted in the housings, so as to be brought into proper working positions with respect to blocks when the latter are covered by the housings.

In the arrangement shown, there are two housings, each provided with suitable jetting elements. One of these housings cooperates with a block at the first station in the apparatus, while the other serves the third station; the intermediate station being simply a place in which a block rests for the purpose of draining the water or other liquid therefrom. Since the two housings, with their jetting elements, are shown as being exactly alike, a description of one will suffice for both.

Supported by the base 2, at a distance substantially greater than the height of a motor block above the rails 1 and 5, are a pair of long, sturdy rails 30. These rails lie at right angles to the rails 1 and 5, they extend entirely across the interior of the casing or framework 28, and the greater part of their length lies outwardly from the casing or framework. Supported by the rails 30 through hangers 31 provided with rollers 32 running on the top of these rails is a long, wide open-work frame structure 34, which in one position, as shown in Fig. 1, lies wholly outside of the more or less enclosed space within which the motor blocks are cleaned, but which may be pushed entirely across said space. This frame structure is of a height or depth greater than that of a motor block and is provided with two housings 35, 35 that are rectangular in cross section and preferably closed on all sides except at the bottom and at the inner end. These housings are so positioned and of such size that they may move into the main casing or framework while the latter contains motor blocks at all three of its stations, and thus serve as covers for motor blocks at the first and third stations where jetting operations are to be performed. Properly proportioning the parts and providing the framework 28 with an outer side wall 36, this latter wall may serve as a cover for the open ends of the two housings when these open ends are brought close to that wall.

The movable frame structure, or housing carrier, with its housings, is shifted by means of a pneumatic power device comprising a cylinder 37 containing a piston, whose piston rod 38 extends out over the movable housing carrier and is connected at its outer end to the upper end of a pedestal 39 fixed to and rising from the housing carrier. The cylinder is preferably placed midway between the two housings 35, namely at the longitudinal center of the housing carrier; and it is also preferably mounted on top of the casing 28, where it is out of the way.

Of course, the jetting devices required in the apparatus depend on a particular kind of motor block. In the arrangement shown there are five jetting devices mounted in and movable with each of the two housings, all being required to lie across the path of the engine blocks and thus prevent the blocks from passing the same while the jetting devices are in their working positions. Of these five jetting devices, three, indicated at 40, 41 and 42, are fixed with relation to the housing within which they are located, whereas the other two, indicated at 44 and 45, are rotatable about their long axes, as well as moving in unison with the housing between idle and working positions.

All of the jetting elements carried by each housing lead to a suitable distributing head 46 supported by the housing carrier, just behind the outer, closed end of the housing; each distributing head supplying its jetting elements with the required cleaning fluid. There is no difference in principle between the distributing and jetting units illustrated and those of our aforesaid patents and it will therefore suffice to say that the travelling housing carrier carries a motor 47 for the purpose of driving the rotatable jetting elements of both units; the power of the motor being applied through a speed-reducing mechanism 48 and a pair of endless chains or belts 49, 49.

Each distributing head is supplied with a cleaning or a drying fluid through a long, flexible conduit 50. Each of these conduits leads to a supply main 51 mounted on top of the main casing. In each of these mains is a valve 52 controlled by a suitable pilot valve 54. These main valves and pilot valves are of well known construction, being fully illustrated in Fig. 3 of the drawing in the aforesaid Patent No. 2,258,562. The pilot valves are so positioned that their stems 55, as best shown in Figs. 1, 2 and 3, are aligned with adjustable pins or screws 56 mounted on a cross bar 57 fixed to the pedestal 39 whereby, when the two housings with their jetting units are just about to reach their working positions within the main casing, the pins or screws 56 engage the stems of the pilot valves and press them back so as to cause the main valves to open and the cleaning fluids or the cleaning and drying fluids to be delivered to the distributing heads.

As heretofore stated, the housing carrier is reciprocated by means of a piston within the cylinder 37. Air under pressure is admitted alternately into opposite ends of this cylinder, each end being opened to atmosphere while compressed air is entering the other end, through a suitable four-way valve 58 mounted on the end of the platform 26. Air is supplied to the valve through a pipe 59 and flows from the valve to opposite ends of the cylinder through pipes 60 and 61. The valve is also provided with an exhaust pipe 62 for connecting either of the pipes 60 and 61, to atmosphere, in order to allow the air from the corresponding end of the cylinder to escape. Valves of this kind are in common use, one of them being disclosed in our aforesaid Patent No. 2,258,562 and particularly in Figs. 23 and 25 of the drawings of that patent. The oscillating handle 64 of this valve is connected at its free end to a link 65, which, in turn, is connected to the lower end of a more or less upright rocker arm 66 mounted on and projecting above the platform 26. The upper end of the rocker arm lies in the path of the crank 21 so that when the crank is in the position which it occupies at the forward end of the stroke of the block-shifting movable rails, the crank has swung the rocker arm in the clockwise direction, as viewed in Fig. 4, far enough to place the pipe 60 which leads to the lefthand end of the cylinder 37 in Fig. 1 in communication with the supply pipe 59. Normally the rocker arm is held by a spring 67, in the position shown in Fig. 4, thereby connecting the pipe 61 and the righthand end of the cylinder 37, as viewed in Fig. 1, to the source of supply of compressed air. Accordingly, the valve is normally in a position to hold the housing carrier in its retracted position as in Fig. 1. However, when the rocker arm is swung to the right, as viewed in Fig. 4, to admit air into the lefthand end of the cylinder, a latch 68 drops behind a lug 69 at the juncture of the valve arm 64 and the link 65, as viewed in Fig. 5, thereby preventing the spring 67 from returning the valve to its normal position when the block-shifting rails make a return stroke. This latch is adapted to be raised by the plunger 70 of an electro magnet 71 so that, at the proper time, air can be admitted into the righthand end of the cylinder to force the housing carrier into its idle position.

A suitable control system is provided for the motors 19 and 47 and for the electro magnet 71. This control system includes a number of relays arranged in a panel box 72 at one end of the casing 28, and four two-positions limit switches 73, 74, 75 and 76, that are mechanically operated to move them out of positions which they automatically assume when free to do so. The switch 73 is mounted on the housing carrier behind one of the fluid distributing heads 46 where its actuating arm or lever is adapted to be driven in one direction by a rotary element 77, rotating in a definite time relation to the rotary jetting elements. Switches 74 and 75 are fastened to one side of one of the stationary carrier-supporting rails 30. As best shown in Fig. 7, said carrier has thereon two shoes 78 and 79 so positioned that, when the carrier is in its retracted position, the shoe 78 presses down on the operating lever of the switch 74; whereas, when the carrier is in its working position in the casing 28, the shoe 79 presses down the lever of the switch 75. The switch 76 is mounted on the platform 26 in the path of one of the levers 25, so as to be shifted into one of its positions by that lever when the rails 5 and 6 are in their normal positions of rest, ready for operation to pick up a motor block or blocks preparatory to shifting the same.

The control system is such that the operator need only operate a simple switch as, for example, a push button such as indicated at 80 in Fig. 2, in order to start the apparatus and cause it to operate through a complete cycle.

The operation of the apparatus of the cleaner will be further described in connection with the wiring diagram constituting Fig. 12, together with Figs. 13 to 16 inclusive, which constitute four repetitions of the diagram illustrating the conditions which exist at different points in a cycle; only those portions of the diagram in these last four figures that are active at the moment being indicated in full lines, whereas the remainder is shown in broken lines.

Referring to Fig. 12, there are shown, in addition to the starting button and the four limit switches, three solenoid-operated relays 82, 83 and 84, together with the motor 19 and a starting switch 85 therefor, and the motor 47 with its starting switch 86. Current for the two motors is taken directly from supply lines L, while the control circuits are supplied with current from the secondary of a transformer T. Normally, when the apparatus is not in use, the circuit conditions are those illustrated in Fig. 12. When it is desired to start a cleaning operation, assuming that the first motor block has been pushed up against the lefthand projections 4 on the stationary rails 1 in Fig. 6: the operator presses the push button 80 so that current may flow from supply wire 87 through the push button, through wire 89, wire 90, limit switch 76, wire 91, and actuating coil 92 for relay 82 and thence to supply wire 88. This causes relay 82 to be closed, as in Fig. 13, and completes a circuit through this relay, from supply wire 87 through a wire 94, through limit switch 74, through the starting switch 85 for motor 19, and back to supply wire 88. Consequently, the motor 19 is set in operation, causing the conveyer composed of the rails 5 and 6 to lift the motor block which is at the entrance to the main casing, carry it to the first station, which is that in which the lefthand motor block is located in Fig. 6, and then lower it into its seat at that station. As soon as the relay 82 closes, there is established a circuit for the solenoid 92, independently of the starting button; this circuit including both the wires 90 and 91, the lower of the two circuit closers in the relay, and the wire 95. Therefore, the push button need be held down only momentarily in order that a cycle will be completed after having been started.

Figure 14:
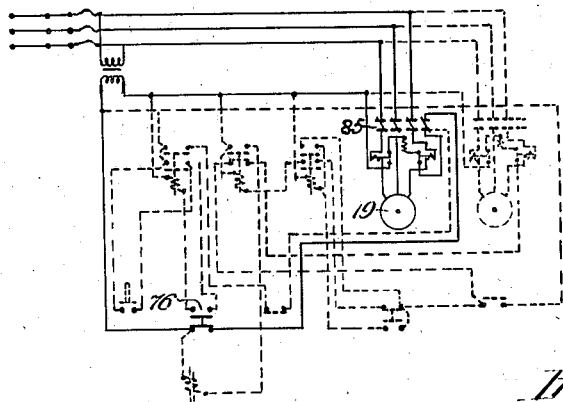
Figure 15:
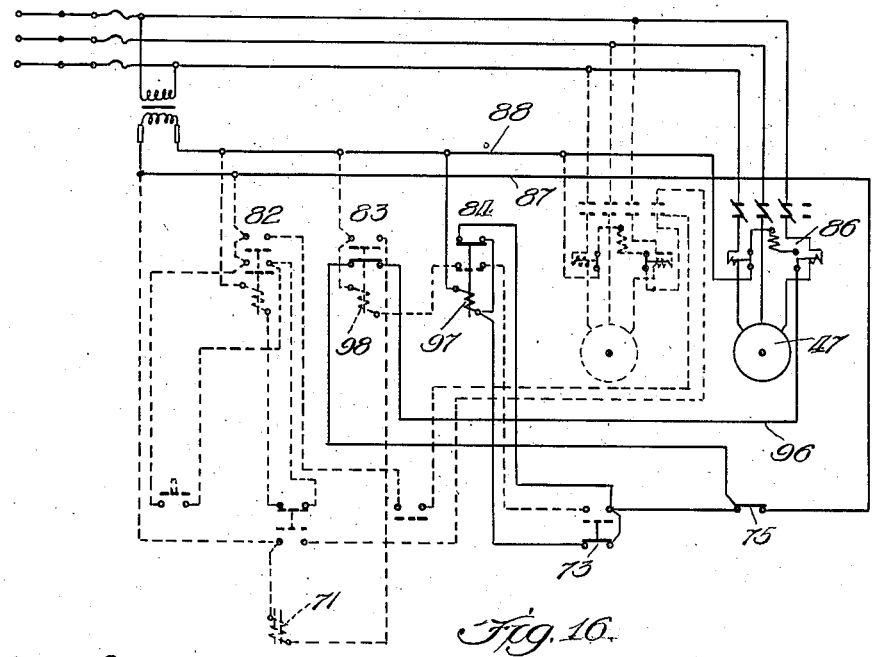

As soon as the levers 25 begin to swing toward the right, as viewed in Fig. 4, the limit switch 76 is freed therefrom so that this switch now automatically assumes the position illustrated in Fig. 14, completing the circuit through the starting switch 85 independently of any other switch or relay. The circuit making and breaking elements in limit switch 76 are of the type that permit the connection established thereby in Fig. 13 to be maintained until the other set of connections, as in Fig. 14, are established when the conveyer for the rail block reaches its forward position, namely the position in which the motor block is directly over the first cleaning station or seat, and the crank 21 has been actuated to throw the air valve 58 into the proper position to permit air to enter the lefthand end of the cylinder 37. Consequently, the housing carrier is moved so as to cause the housings to enter the casing 28; one of the housings extending over the block which is now at the first station, and the jetting elements in that housing being properly positioned with respect to the block. As heretofore explained, the air valve is latched in this new position so that the housings with their jetting elements must remain in their working positions until the valve is again unlatched. As the carrier moves or begins to move from its idle, retracted position, toward its working position, the shoe 78 moves away from the operating lever of the limit switch 74, so that this switch automatically opens as shown in Fig. 15. Since a cycle, upon pressing the push button, can start only when the limit switch 74 is closed, the opening of this switch immediately after the housing carrier begins to move toward its working position, while it does not interrupt the circuit for the conveyer motor at this time, prevents the conveyer from starting again after it has been stopped. When the housing for the carrier reaches its working or cleaning position, the limit switch 75 is closed by means of the shoe 79 on the carrier, thereby bringing about the conditions existing in full lines in Fig. 15 and causing the motor 47 to start; the circuit for the starting switch of motor 47 being from supply wire 87 through the limit switch 75, through the lower contacts of relay 83, through wire 96, through the starter 86, and thence to supply wire 88. As soon as the washing motor starts, the arm 77 of the timing device operated by the motor 47 moves away from the operating lever of limit switch 73, so that this switch automatically shifts from the position shown in Figs. 12, 13 and 14 to that in Fig. 15. This causes current to flow from supply wire 87, through limit switch 75, the lower contacts of limit switch 73, through the actuating coil 97 of relay 84, and thence to supply wire 88. The cooperating contacts in this relay are therefore brought together so that when the limit switch 73 is shifted again, a circuit is established to energize the coil 98 of relay 83. It will of course be understood that the conveyer motor 19 continues to operate until the reciprocable conveyer has made a return stroke so that one of the levers 25 again engages the actuating arm of the limit switch 76 as in Fig. 4, thereby interrupting the circuit for the starter 85 and causing the conveyer motor to be deenergized.

Of course, as the housing carrier reaches its working position, it opens the pilot valves 54, causing jets of washing liquid, in the one instance, and of drying fluid in the other, to be discharged, at the first and third cleaning stations. There is at this time only one block in this apparatus, namely that at the first station, and it is washed as long as the valve in the washing water pipe remains open.

Figure 16:
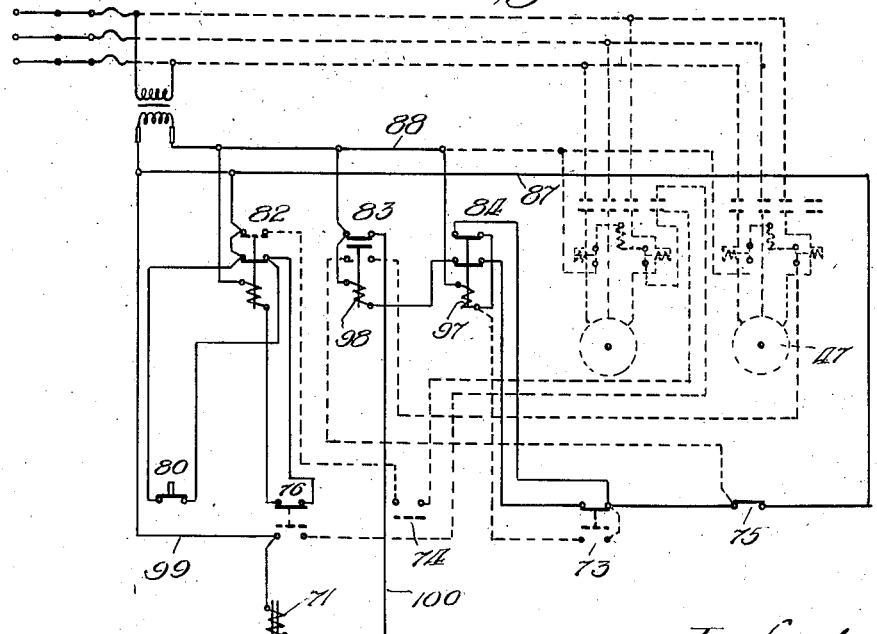

After the motor 47 has made a predetermined number of revolutions, the arm 77, driven by the motor, again engages the lever or arm of limit switch 73 and shifts the switch from the position indicated in Fig. 15 to the position it occupies in the other diagrams. This permits current to flow from line 87 through limit switches 75 and 73, relay 84 and coil 98 of relay 83, thereby shifting the latter relay to interrupt the circuit for the motor starter 86. At the same time, there is established an energizing circuit for the electromagnet 71, to cause the latter to trip the latch that holds the air valve 58 against assuming the position in which compressed air is supplied to the righthand end of the cylinder 37 as viewed in Fig. 1. This circuit, as shown in Fig. 16, is from line 87, through wire 99, coil of electromagnet 71, through wire 100, through relay 83 and back to line 88. Consequently, air enters the righthand end of cylinder 37, while the opposite end is vented to atmosphere, and the housing carrier is pushed out of the main casing, leaving unobstructed the path that the motor blocks must follow while travelling through the apparatus. As the carrier starts back from its working position, the limit switch 75 opens, thereby breaking the circuits for the coils of the relays 83 and 84. This leaves the circuits in such condition that upon the subsequent closing of limit switch 74, when the carrier is fully retracted, the cycle of operations cannot again be started until the push button is again pressed. In Fig. 16 the push button is shown closed and the coil of relay 82 energized because, even if this is done while the circuit conditions are otherwise as indicated, the conveyer motor cannot start until the limit switch 74 closes. This characteristic of the system is advantageous in that it permits the operator to energize the coil of relay 82 before a cycle is completed and thus be ready automatically to start a new cycle at the end of that cycle without being present at the time of starting the new cycle. Therefore, the operator may place a block in position to be picked up by the conveyer at the end of a cycle which is not yet ended and then go down the line and bring up more blocks into the vicinity of the cleaning apparatus.

The second cycle results in moving the first block into the second or draining station and bringing a second block into the washing station. After the third cycle gets under way, all three stations contain blocks, and this condition is thereafter maintained as long as blocks continue to be delivered to the conveyer, a clean block being discharged at the front end of the apparatus whenever a block to be cleaned is carried into the rear end.

Some of the required jetting devices may be so placed as not to interfere with the progress of motor blocks through the cleaning apparatus, even though these jetting devices remain in fixed positions. Thus, in the arrangement shown, only a part of the fluid passing through each of the main valves 52 flows into the corresponding flexible conduit 50, while another part flows through a pipe 101 extending across the top of the casing 28. A branch pipe 102, extends down past the outer side of the casing from each of the pipes 101. Connected to each of these branch pipes are two jetting pipes 103, 104 which extend into the casing 28 parallel with the movable jetting elements and at such a height as to lie above motor blocks in the casing and yet be contained in the housings when the latter are shifted into their working positions. Connected with each of the pipes 102 is also a short, vertical jetting element 105 lying close to the outer side wall of the casing for the purpose of operating on one end of a motor block. In addition, there may be a flat jetting element 106 about as long and as wide as the bottom of a motor block, lying underneath the rails 6 at the washing station and at the drying station; each of these jetting elements being connected to the corresponding pipe 102.

While we have illustrated and described with particularity only a single preferred form of our invention, we do not desire to be limited to the exact structural details thus illustrated and described; but intend to cover all forms and arrangements which come within the definitions of our invention constituting the appended claims.

We claim:

1. A machine for cleaning motor blocks having a casing containing at least two stations to be occupied by such blocks, means for moving blocks one after another sidewise into and through said casing and said stations and allowing them to remain for a short time at each station, a movable cover for a motor block adjacent to at least one of said stations and having jetting means within the same and carried thereby, and means to move said cover over each of the blocks and render the jetting means active during the period of rest of the latter in the last-mentioned station.

2. A machine for cleaning motor blocks having a casing containing at least two stations to be occupied by such blocks, means for moving blocks one after another sidewise into and through said casing and said stations and allowing them to remain at rest for a short time at each station, a housing on the outside of the casing beside at least one station and having the end toward that station open, fluid-discharging elements secured in and carried by said housing, and means to move said housing laterally into the casing to cover each block and bring its open end near to a side wall of the casing during a part of the period of rest of the block in the station with which the housing is associated.

3. A machine for cleaning motor blocks comprising a long casing open at the ends and at one vertical side, stationary rails arranged longitudinally in the bottom of the casing and having on top thereof work-receiving seats for accurately positioning motor blocks and defining work treating stations, means for moving motor blocks through said casing into one after the other of said seats and allowing each to remain a predetermined time in each seat, a jetting apparatus at the open side of the casing beside at least one of said stations, and means to move said apparatus into and out of the casing during the time a motor block remains in a station.

4. A machine for cleaning motor blocks comprising a long casing open at the ends and at one vertical side, stationary rails arranged in and extending through the length of the casing, said rails having on top thereof three work receiving seats for accurately positioning motor blocks and defining treating stations spaced apart lengthwise of the casing, means for moving motor blocks through the casing into one after the other of said seats and allowing each to remain a predetermined time in each seat, jetting apparatuses at the open side of the casing beside the first and third seat, and means to move said apparatuses into and out of the casing during each period of time that a motor block remains at a station.

5. A machine for cleaning motor blocks comprising a long casing open at the ends and at one vertical side, stationary rails running through the length of the casing and having on the top work receiving seats for accurately positioning motor blocks and defining treating stations, means to move motor blocks through the casing into one after the other of said seats and allowing each to remain a predetermined time in each seat, a housing at the open side of the casing beside at least one of said stations and open on the side toward the casing, jetting means in said housing and secured thereto so as to be movable therewith, and means to move said housing into and out of the casing during each period of time that a motor block remains at a station.

6. A machine for cleaning motor blocks comprising a long casing open at the ends and at one vertical side, stationary rails arranged longitudinally in the casing and having on top thereof work receiving seats for accurately positioning motor blocks and defining treating stations, means for moving motor blocks through said casing into one after the other of said seats and allowing each to remain a predetermined time in each seat, a track in said casing transverse to the rails and extending out through the open side of the casing, a jetting apparatus mounted on said track for movements into and out of the casing at one of said stations, and means to move said apparatus along the track into and out of the casing during each period of time that a motor block remains at a station.

7. A machine for cleaning motor blocks having at least two stations to be occupied by such blocks, means to move blocks, each having in an end a passage to be cleaned, sidewise into and through said stations, a housing containing jetting means beside each of such two stations, one of said jetting means in each housing being aligned with said passage when a block is at the station corresponding to that housing, and means to move said housings transversely of the path of said blocks to cover them when they are in said stations and cause the aligned jetting means to enter said passages and again to retract the housings before the blocks leave the stations.

FRED C. AREY.
DE LOS E. HIBNER.